June 18, 1940.  D. C. BRAGG  2,205,133

FOOD TENDERIZER

Filed June 23, 1937  2 Sheets-Sheet 1

INVENTOR
DILLON C. BRAGG
BY
ATTORNEY

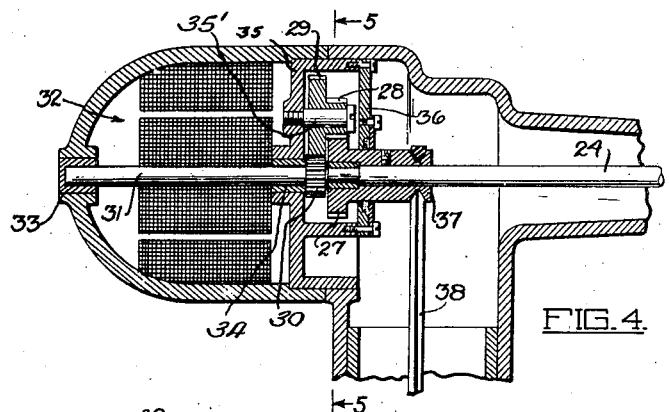
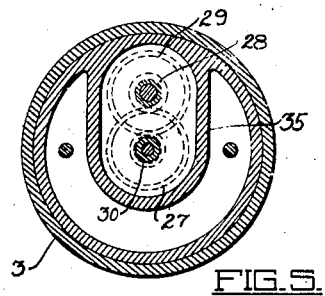
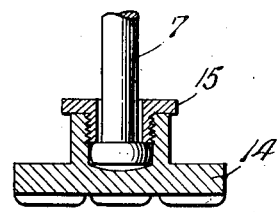
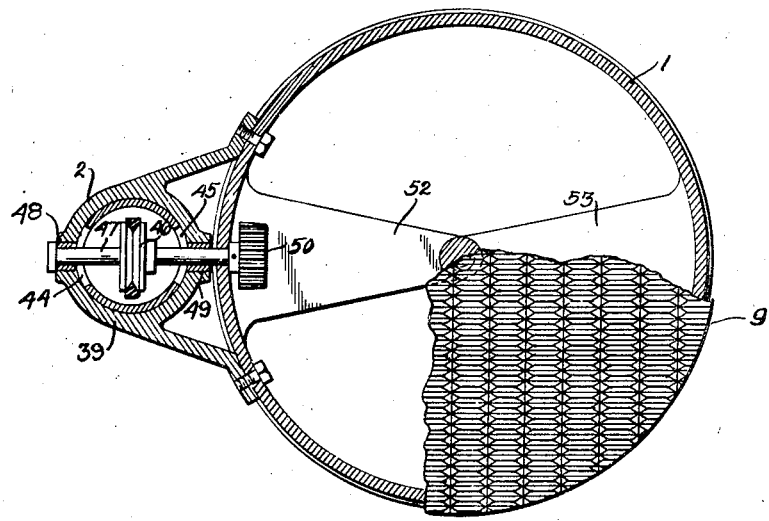

Patented June 18, 1940

2,205,133

UNITED STATES PATENT OFFICE 2,205,133

FOOD TENDERIZER

Dillon C. Bragg, Glendale, Calif., assignor of fifteen per cent to Donald Offill, Los Angeles, fifteen per cent to William Vaughn and fifteen per cent to Guy Adams, both of Glendale, Calif.

Application June 23, 1937, Serial No. 149,858

12 Claims. (Cl. 17—25)

This invention relates to food tenderizers and particularly to a motor-powered meat pounder.

Devices of different types have been and now are employed for the purpose of tenderizing food and particularly meats, such as pounders held and manipulated entirely by hand and ringers wherein the meat is passed between rollers to break or crush the fibers. The hand pounder is perhaps the most satisfactory of any of these devices from the standpoint of performance, since absolute control is obtainable over the different portions of the article being tenderized. The ringer type is not only less flexible, but, in order to produce greater tenderizing at a particular spot, it is necessary to subject the entire steak to the same action, with the result that many portions thereof are overcrushed.

The present invention is directed to a motorized pounder which is under complete control of the operator and which permits concentration on any particular portion of an article. Furthermore, a more uniform and better tenderizing action is obtainable since the degree of pounding is adjustable. This adjustment may be accomplished during operation of the device, thus quickly obtaining the optimum setting without stopping and starting the machine. A particular feature of the invention is the rapidity with which a piece of meat may be tenderized, since, although the blow is applied to one side only, the tenderizing effect is produced on both sides without the necessity of turning the meat over. Furthermore, not only is the pounding action directable to a particular portion, but the platform upon which the meat rests is rotatable during operation of the machine in order to provide access to all portions of the meat without manually changing the position of the meat.

An object of the invention is to more quickly and efficiently facilitate the tenderizing of food articles such as meat.

Another object of the invention is to obtain the same tenderizing action on both sides of a food article without turning the article over.

A further object of the invention is to obtain simultaneous rotation and adjustable reciprocatory action between cooperating elements of a motor-driven meat pounder, the degree of cooperation being adjustable during operation, while the position of cooperation is controllable at will.

Other objects and features of the invention will be pointed out and the invention itself will be more fully understood by reference to the following description read in conjunction with the accompanying drawings, in which:

Fig. 4 is a cross-sectional view of the motor and reduction gear drive.

Fig. 5 is a cross-sectional view taken along the line 5—5 of Fig. 4,

Fig. 6 is a plan view of the lower portion of the invention partly in section showing the construction of the base plate, tubular support and table supporting and rotating mechanism, and Fig. 7 is a detailed view of the hammer connection to its driving mechanism.

Figure 1:
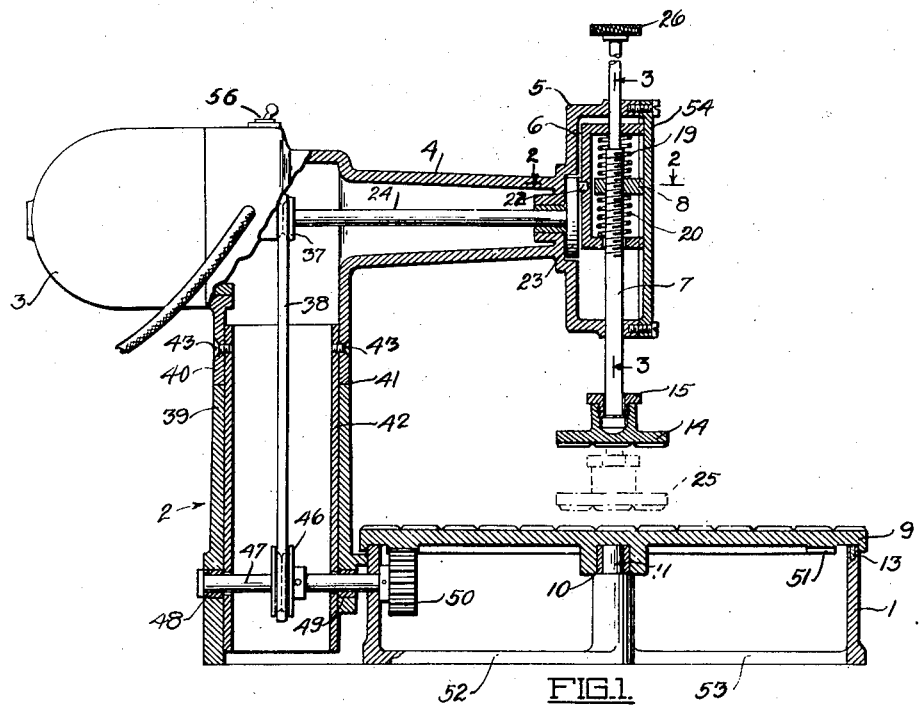
Fig. 1 is a side elevational view in partial cross-section showing a preferred embodiment of the invention.

Referring now to Fig. 1, a base member 1 has attached thereto a columnar support 2 which carries a motor casing 3 and an extension arm 4. Integral with, and forming a part of the extension arm 4 is a vertically elongated head 5 which completely houses a U-shaped bracket or member 6, a centrally disposed nut 8 and a pair of springs 19 and 20, and partially houses a shaft 7 upon which nut 8 is threaded. Springs 19 and 20 surround shaft 7, spring 19 being disposed between the upper arm of bracket 6 and nut 6, while spring 20 is disposed between the lower arm of member 6 and nut 8, thus resiliently interconnecting the shaft 7 with the U-bracket 6. This resilient mounting serves not only to absorb reciprocating shocks to quiet operation of the pounder, but provides a safety factor for the apparatus in case of bones or other hard substances in the articles being tenderized, and safety to the operator should he accidentally get a hand under the hammer.

A hammer 14 is loosely secured to the lower end of the shaft 7 by means of a nut 15 threaded into the hammer 14. The lower end of shaft 7 located within the hammer 14 has a diameter larger than the remainder of the shaft and larger than the internal diameter of the nut 15 to maintain the hammer on the shaft. However, the internal diameter of the nut 15 is somewhat larger than that part of the shaft 7 passing through the nut 15 in order that the rounded end of the shaft 7 will provide for semi-universal action of the hammer 14. This type of hammer connection therefore, permits the hammer to tilt when passing over bones in the meat to prevent chipping of the bones or damage to the apparatus. The lower surface of the hammer is lattice-grilled to function as a fiber breaker for meats and like articles, the dotted lines 25 showing the lower position of the hammer during reciprocation for a particular adjustment of the hammer stroke.

Figures 2, 3:
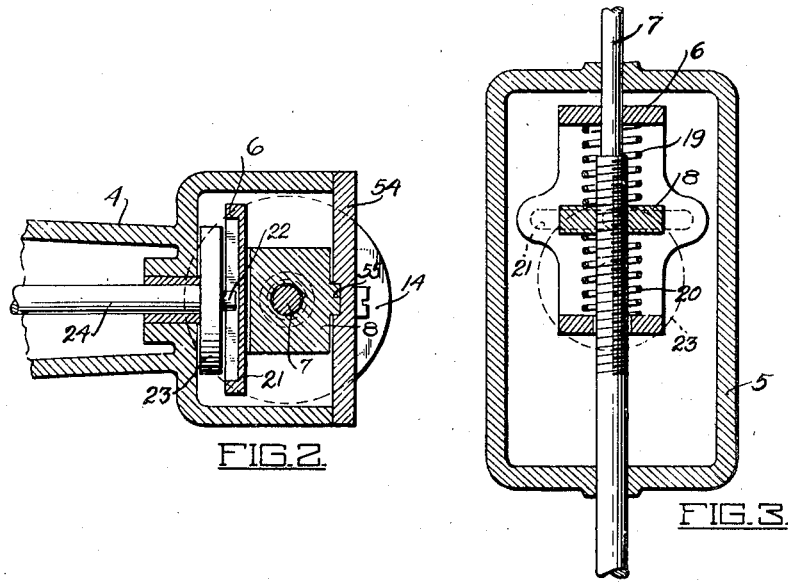
Fig. 2 is a cross-sectional view taken along the line 2—2 of Fig. 1 showing the cam and slot mechanism.
Fig. 3 is a cross-sectional view taken along the line 3—3 of Fig. 1 showing the spring and reciprocating mechanism.

The stroke or throw of the hammer is adjustable at any time by turning the reciprocating rod 7 by a knurled hand nut 26 at the top thereof, thus varying the position of rod 7 on nut 8. The head 5 is closed by a cover plate 54 bolted thereto and having a slot 55 vertically disposed therein for accommodating a projection on the nut 8 and projections on the arms of U-bracket 6 (see Fig. 2). These projections and slot serve as a vertical guide during reciprocation. As shown in Figs. 2 and 3, the U-bracket 6 has a slot 21 formed in a centrally expanded portion thereof. Inserted in the slot 21 to actuate the U-bracket 6 is a pin 22 radially disposed in a disk 23 connected on the end of a drive shaft 24. Rotation, therefore, of disk 23 causes the U-bracket 6 to reciprocate vertically, thus actuating the hammer 14 in the same manner.

Referring now to Figs. 4 and 5, the shaft 24 is driven by a gear 27 at the end thereof, gear 27 being meshed with a gear 28 on a stub shaft 35' and integral with a gear 29, gear 29 being in mesh with a gear 30 driven directly by the shaft 31 of motor 32. These reduction gears provide a reciprocating speed of approximately 600 cycles per minute at a motor speed of 1750 R. P. M. For different motor speeds or different hammer speeds various gear ratios may be employed. The motor shaft 31 is mounted in bearings 33 and 34. The gears are mounted and housed in a cup-shaped gear casing 35 having a cover member 36 bolted thereto. The gear 27 is formed on a collar having at one end a belt slot 37 to accommodate a belt 38 which is preferably V-shaped.

The standard 2 is formed of two sections 39 and 40, the sections abutting at 41. An internal sleeve 42 attached to section 40 by screws 43 or other suitable means is adapted to rotate within section 39 to the extent permitted by circumferential slots 44 and 45 shown in Fig. 6. The bracket arm 4 may, therefore, be rotated about a vertical axis at the center of standard 2, thus permitting the hammer 14 to be moved back and forth across the base 1. It is to be noted that since the motor 32 is mounted on the short end of extension 4, and the head and its associated elements are mounted on the long end of the extension, there is no binding action to rotation about the vertical axis, since the weights of the motor and head are equalized about the axis.

Now referring to Figs. 1 and 6, the belt 38 is connected to a pulley 46 mounted on a shaft 47 having bearings 48 and 49, and at the end of which is a pinion gear 50 mounted under a circular table 9 having a cooperating circular rack 51. The table 9 is supported at its center on a bearing 10 mounted on a post 11. A wick 13 provides lubrication for the portion of the table where it contacts the outside circumference of the base support 1. Ribs 52 and 53 connect the base rim 1 with the post 11. It is to be noted that the surface of the table 9 is lattice-grilled similar to the hammer surface to cooperate with the hammer surface in the tenderizing of meats.

To operate the meat pounder above described, the article, such as a steak, is placed on table 9. Switch 56 is then thrown to energize motor 32 which reciprocates hammer 14 while rotating table 9. According to the thickness of the steak, the nut 26 is adjusted to position the hammer 14 at its optimum position for best tenderizing action. During operation, the arm 4 may be grasped by the operator and the hammer placed at will at any radial position with respect to the table 9. The operator can thus control the parts of the steak which are to receive more pounding and avoid other parts which require less pounding, it being obvious that all parts of the steak are accessible for pounding, since the hammer is adapted to pass substantially diametrically across the table during rotation of the table and the meat thereon. With this device, a steak may be tenderized in a few moments with absolute control at all times, it being unnecessary to turn the steak over inasmuch as the grilled table surface will co-act with the hammer surface to break or crush the fibers on the underside of the steak as the hammer is applied to the top-side.

It is to be understood that different types of hammer and table surfaces may be employed for pounding different types of articles. For instance, a smooth-surfaced table may be interchanged with the grilled-surfaced table, or a smooth-surfaced block of wood or other material may be superimposed on top of the grilled table or any other type of table to provide the type of pounding action desired.

I claim:

1. A meat pounder comprising a base having a standard on one portion thereof, a rotatable table mounted on said base, an extension from the upper portion of said standard, one end of which extends substantially over the center of said table, a hammer mounted at the end of said extension and adapted to be reciprocated, and means mounted at the other end of said extension for reciprocating said hammer above said table and for rotating said table, (said extension adapted to be rotated on said standard during reciprocation of said hammer).

2. A meat pounder comprising a base member, a substantially circular table mounted on said base member and adapted to be rotated, a standard on said base member having an extension over said table, a motor mounted at one end of said extension, a reciprocating hammer mounted at the other end of said extension, said motor being connected thereto for actuating said hammer and said extension being rotatable on said standard for moving said hammer across said table, and mounting means for said hammer adapted to permit said hammer to assume various angles with respect to said table.

3. A meat pounder comprising a frame having a lower horizontal portion and an upper arm portion, a table adapted to be rotated on said lower portion, a reciprocating hammer adapted to be mounted on said upper arm portion, and a motor connected to said hammer, said motor being mounted on said upper arm portion and adapted to reciprocate said hammer above said table, said arm portion being adapted to rotate to position said hammer in different positions over said table.

4. A meat pounder comprising a circular base, a circular table supported at the center and circumferential portion of said base and adapted to be rotated, a tubular standard attached to said base, said standard having two sections, the upper section of which is adapted to rotate within predetermined limits, a horizontal extension from said standard, one end of said extension extending substantially to the center of said table, a motor mounted on the other end of said extension, a vertical rod mounted on said extension above said table, a hammer mounted on the lower end of said rod, a shaft extending from said motor through said extension, and means adapted to connect said shaft with said vertical rod for obtaining reciprocating action of said rod when said motor is energized.

5. A meat pounder in accordance with claim 4 in which said last-mentioned means comprises a U-shaped member having a centrally disposed horizontal slot therein, a member interposed between the arms of said U-member and threadably engaging said rod, a pair of springs interconnecting said last-mentioned member with said U-member, and means interconnecting said motor shaft with said U-member.

6. A motorized meat pounder for tenderizing meats comprising a circular rotatable table having a fiber breaking surface thereon, a hammer supported above said table having a fiber breaking surface on the underside thereof, a horizontal tubular extension for mounting said hammer for reciprocating action above said table and for horizontal movement over said table, a motor mounted on said extension adapted to reciprocate said hammer and rotate said table, means for connecting said motor with said hammer, means for connecting said motor with said table for rotating said table, and means for supporting said table for rapid removal thereof.

7. A meat pounder comprising a table for supporting meat, a hammer mounted above said table, means for reciprocating said hammer in a vertical direction above said table, said hammer being movable across said table, and manual means for adjusting the reciprocatory stroke of said hammer with respect to said table during reciprocation thereof.

8. A meat pounder comprising a frame having a lower horizontal portion and an upper arm portion, a table on said lower portion, a hammer mounted on said upper arm portion and adapted to be reciprocated above said table, and a motor mounted on said upper arm portion and connected to said hammer for reciprocating said hammer, (said upper arm portion being rotatable for adjusting said hammer in different positions over said table).

9. A meat pounder comprising a frame having a lower horizontal flat table portion and an upper horizontal arm portion, one end of said arm portion adapted to be oscillated substantially diametrically across said table portion, a pounding hammer mounted on said end portion movable over said table portion, and means for reciprocating said hammer above said table portion during oscillation of said arm portion over said table portion.

10. A meat pounder in accordance with claim 9 in which said table is simultaneously rotated during reciprocation of said hammer and oscillation thereof across said table portion.

11. A meat pounder comprising a frame having a lower horizontal portion and an upper arm portion, a table adapted to be rotated on said lower portion, a hammer mounted on said upper arm portion above said table, and a motor connected to said hammer and to said table for reciprocating said hammer and simultaneously rotating said table, said upper arm portion being rotatable to position said hammer in different positions over said table during rotation of said table and reciprocation of said hammer.

12. A pounder having a table for supporting articles to be pounded, a hammer mounted over said table, a motor, means for interconnecting said motor to said hammer for reciprocating said hammer above said table, means for resiliently interconnecting said motor with said hammer, and manual means for adjusting the distance said hammer approaches said table during reciprocation of said hammer while maintaining the resiliency of said connection constant.

DILLON C. BRAGG.